United States Patent [19]

Groess

[11] Patent Number: 5,675,873
[45] Date of Patent: Oct. 14, 1997

[54] CLAMPING RING WITH SLANTED CLAMPING SURFACES FOR SECURING FLANGED COMPONENTS TO EACH OTHER

[75] Inventor: Helmut Groess, Esterhofen, Germany

[73] Assignee: MTU Motoren- und Turbinen-Union Muenchen GmbH, Munich, Germany

[21] Appl. No.: 761,853

[22] Filed: Dec. 9, 1996

[30] Foreign Application Priority Data

Dec. 16, 1995 [DE] Germany ............... 195 47 172.5

[51] Int. Cl.$^6$ .................. B65D 63/00; F16L 35/00
[52] U.S. Cl. .................. 24/284; 24/279; 285/187
[58] Field of Search .................. 24/284, 282, 274, 24/279, 281; 285/187

[56] References Cited

U.S. PATENT DOCUMENTS

| | | | |
|---|---|---|---|
| 1,635,783 | 7/1927 | Goodall | 24/284 |
| 2,720,079 | 10/1955 | Mines | 285/187 |
| 3,398,978 | 8/1968 | Gasche | 285/187 |
| 5,018,768 | 5/1991 | Palatchy | 24/284 |

FOREIGN PATENT DOCUMENTS

| | | |
|---|---|---|
| 749808 | 10/1970 | Belgium. |
| 0352018 | 1/1990 | European Pat. Off.. |
| 2697893 | 5/1994 | France. |
| 35501 | 9/1885 | Germany. |
| 126655 | 5/1919 | United Kingdom. |

*Primary Examiner*—Victor N. Sakran
*Attorney, Agent, or Firm*—W. G. Fasse; W. F. Fasse

[57] ABSTRACT

Two components such as pipes having radial end flanges with conical flange clamping surfaces are clamped together by a clamping ring having at least two ring sections with conical ring clamping surfaces engaging said conical flange clamping surfaces when clamping screws passing through section ends are tightened. The ring sections have an inner ring radius (RR) slightly larger than a respective flange radius (FR) for providing a positive but gradual engagement between said conical surfaces when said ring sections are clamped together for example by threaded bolts or screws at ring section ends.

8 Claims, 4 Drawing Sheets

4,675,873

CLAMPING RING WITH SLANTED CLAMPING SURFACES FOR SECURING FLANGED COMPONENTS TO EACH OTHER

FIELD OF THE INVENTION

The invention relates to a clamping ring with slanted or conical ring clamping surfaces that cooperate with respectively slanted or conical flange clamping surfaces of end flanges secured to ends of structural components. The end flanges extend radially from the components such as pipes, housings, gear boxes, engine blocks and the like.

BACKGROUND INFORMATION

Clamping rings for flange connections are used to provide a releasable coupling between components of the above type. Three different types of couplings are known utilizing clamping forces effective in different directions. One type of coupling uses axially effective clamping screws simply passing through holes in radially extending flanges. A second type of coupling uses a clamping ring with at least one circumferentially effective connector element, such as a clamping screw, whereby slanted or conical surfaces cooperate with each other to convert a circumferentially effective clamping force into axially effective clamping force components. The clamping surfaces may be provided with cut-outs or gussets to permit opening and closing of the clamping ring. A third conventional clamping device uses individual clamping segments with C-cross-sectional configuration having a circumferential ring and two radially inwardly extending ring rims with conical surfaces cooperating with respective conical flange surfaces. The C-segments are secured to one of the flanges by radially inwardly extending screws.

In coupling clamps of this type it is necessary that axially effective clamping force components are generated to assure a tight seal between the connected components. The clamping connection is accomplished concentrically relative to a longitudinal axis. However, particularly this requirement heaves room for improvement. In addition to the required seal it is also necessary that the clamping or coupling is capable of transmitting the forces and moments to which the components are exposed in operation.

The above mentioned first type of an axial flange coupling normally uses flanges with through-bores, the number of which is dividable by four and the axes of these bores extend in parallel to the longitudinal component axis. Further, the axial clamping screws of the first type and the radial clamping screws of the third type must be accessible all around the coupling. Frequently space limitations prevent the use of the first and second type of coupling.

The second type of coupling is well suited for application in limited space, whereby the connecting element such as screws can be positioned where they are readily accessible by rotating the clamping ring around the flanges to the extent necessary. Even the ring coupling leaves room for improvement, especially with regard to the generation of positively effective axial clamping forces unhindered by an inadequate clamping surface area contact between the clamping ring and the flanges due to contacts between radially inwardly facing surfaces of the clamping ring and radially outwardly facing surfaces of the flange or flanges, whereby these radially effective contacts prevent the proper formation of axially effective clamping surface area contacts uniformly all around the clamping ring or clamping ring sections.

Belgian Patent 749,808 (Sogev) describes a quick release clamping mechanism with a lever that functions as a toggle to apply a half clamping ring to the flanges of two pipe ends. The axially effective clamping forces are primarily applied only at two diametrically opposite points or small areas with the help of cooperating conical slanting surfaces. Positive axial clamping forces evenly distributed around the entire flange areas over substantially all of 360° are not possible with the quick release clamp according to Belgian Patent 749,808.

European Patent Publication 0,352,018 A1 (Jardin) published on Jan. 24, 1990 describes a pipe jointing or closing device, in which two or more clamping sections 14 hold a flexible sleeve 12 having a rim flange inside a pipe 10. The clamping sections 14 are held together by screws 15 passing through respective section end holes tangentially to the pipe 10 and through lugs 11 formed at the end of the pipe. The structure of the European Patent Publication 0,352,018 A1 requires extra wedges to provide a somewhat uniformly distributed clamping action.

U.S. Pat. No. 3,398,978 (Gasche) issued on Aug. 27, 1968 discloses a resilient coupling for flanged pipe ends, whereby two clamping rings with conical ring clamping surfaces hold helically wound ring springs in ring grooves of the flanges to make the coupling flexible. A thrust washer 15 is inserted between the conical ring clamping surfaces and the helically wound flexible ring springs.

European Patent Publication 2,697,893 (Ouvrard), published on May 13, 1994 describes a coupling with two coupling levers hinged to each other at one end and clamped together at the opposite end, for example by a threaded rod. One rod end is hinged to one lever end, while the other rod end passes through a fork and engages a wing nut. A uniform clamping for substantially 360° of the two flanges is not assured by such a structure.

OBJECTS OF THE INVENTION

In view of the above it is the aim of the invention to achieve the following objects singly or in combination:

to construct a clamping ring of the type described above in such a way that it can be easily rotated prior to the final clamping operation to bring connector elements for the ring sections into easily accessible positions;

to apply axially effective clamping force components unhindered by any radially effective stops and without holes through the radially extending flanges;

to facilitate the relative rotation between the components to be clamped and the clamping ring sections with due regard to the structural requirements of the components; and to make sure that the clamping ring sections engage the flanges uniformly substantially around a full circle to assure the formation of uniform axial clamping force components applied uniformly to the flanges to assure a proper seal while keeping the connector elements readily accessible.

SUMMARY OF THE INVENTION

The clamping ring 1 according to the invention comprises at least two ring sections 11A, 11B for encircling component flanges 4A, 4B. The ring sections have a C-cross-sectional configuration. The ring sections are held together by connector elements 13. Each clamping ring section comprises a pair of radially inwardly extending conical ring clamping surfaces 10A, 10B, whereby the conical slant of the ring clamping surfaces is preferably the same as the conical slant of the flange clamping surfaces. Further, the ring clamping surfaces have a slightly larger center radius RR than the center radius FR of the flange clamping surfaces 7A, 7B. The radii RR and FR are measured to a ring positioned in the middle or center of the respective ring clamping surface and the respective flange clamping surface.

The slight difference D in the length of the above mentioned radii RR and FR is critical because it assures that the clamping ring sections gradually encircle uniformly the entire flange clamping surfaces as a tangentially or circumferentially effective ring closing force is applied, thereby assuring that the axial clamping force components are uniformly distributed around substantially the entire flange clamping surfaces.

It is an advantage of the invention that the clamping ring sections engage the flanges substantially only along the clamping surfaces of the flanges after the clamping is completed, without any substantial radial surface contact, so that a tight seal is assured, even though a flange penetrating connection is avoided. Further, it is possible to freely move the clamping rings and/or the flanges in the circumferential direction prior to completing the tightening of the connector elements, whereby these connector elements can be brought into a position where they are easily accessible and the flanges can be positioned with due regard to the requirements of the machine components or pipes to be coupled.

Further, dividing the clamping ring into at least two ring sections facilitates the mounting because the ring sections initially rest loosely on the flange clamping surface at a point contact S, thereby permitting the above mentioned circumferential rotation to bring the connector elements in the best possible and accessible position for tightening or loosening. In this connection, it has been found to be sufficient to divide the clamping ring into two sections, which, due to their slightly larger center ring radius RR provide, prior to clamping, initially a point contact between the ring sections and the flange clamping surfaces and this point contact is then gradually increased into uniform surface area contacts as the connector elements are tightened. Upon completion of the tightening, the initial point contact may even be completely removed, so that there remains a small circumferential spacing between the clamping rings and the radially outwardly facing surfaces of the flanges to avoid radial force components that might counteract the axial clamping force components.

BRIEF DESCRIPTION OF THE DRAWINGS

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
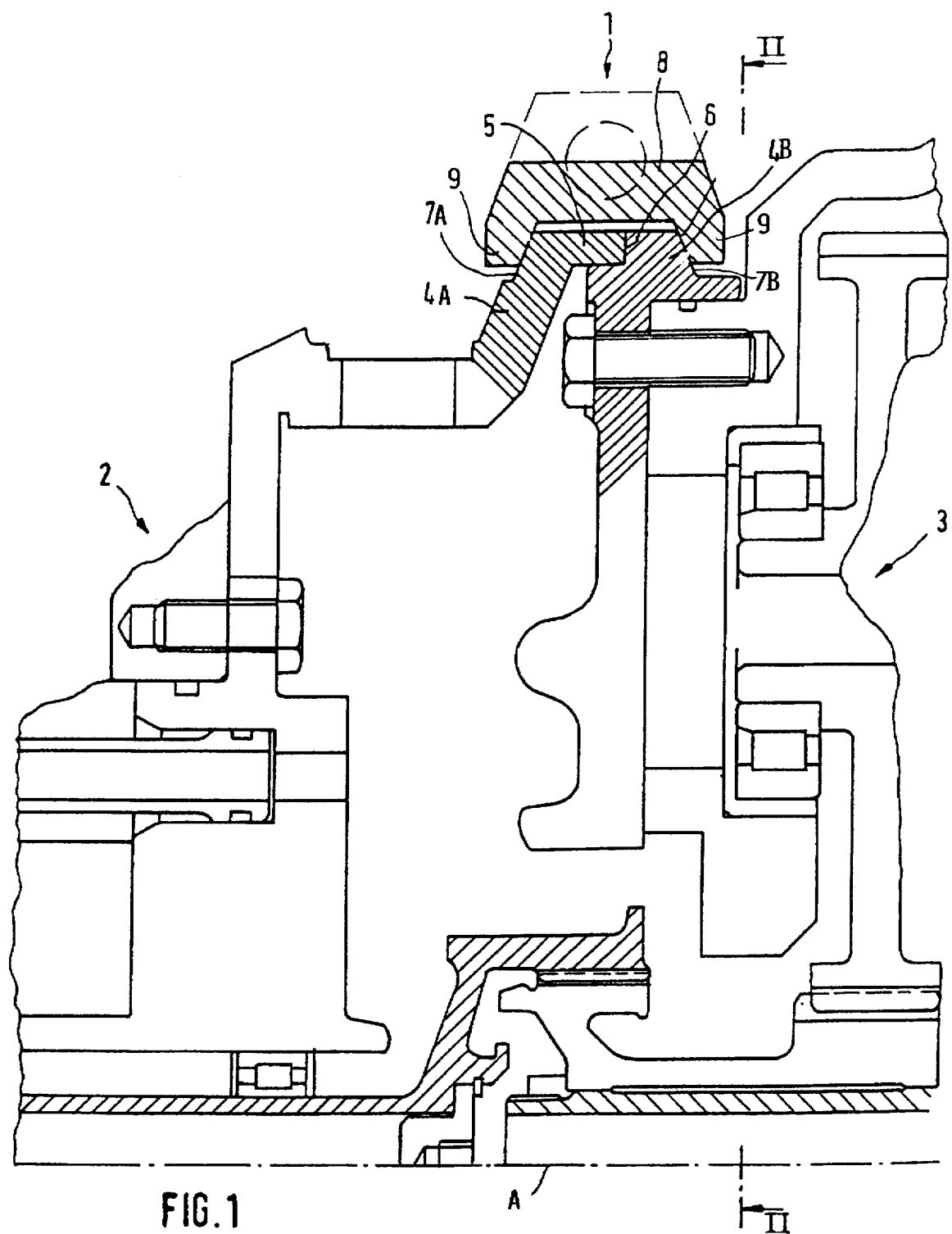
FIG. 1 shows an axial side view, partially in section, through a flange connection between an engine and a gear box.
Figure 4A:
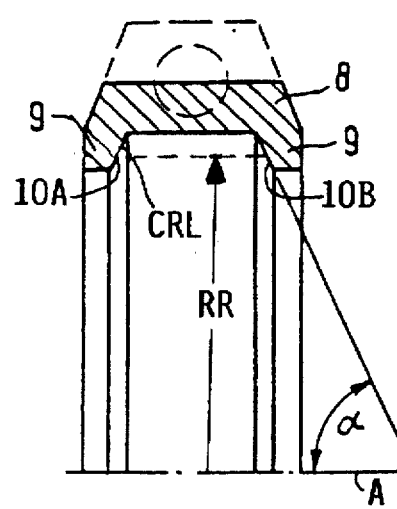
FIG. 4A illustrates a sectional view through one of the present clamping ring section in a section plane passing centrally through the central axis of the pipe connection.
Figure 4B:
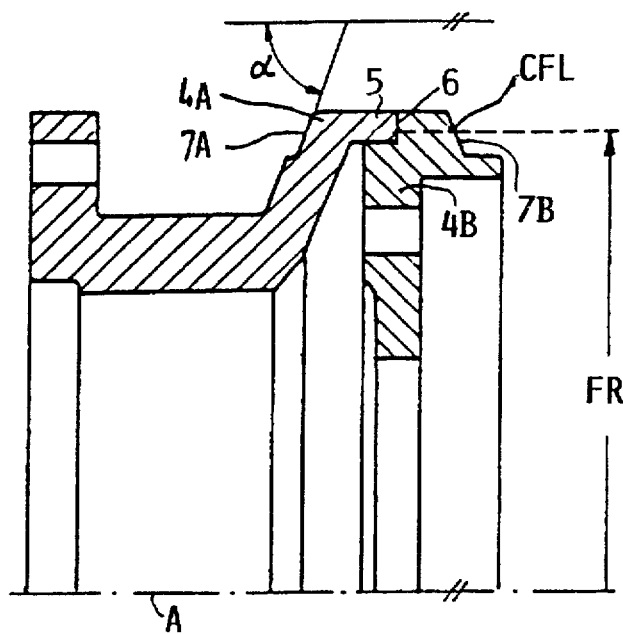
FIG. 4B is a view similar to that of FIG. 4A, however showing two flanges in section.

FIG. 1 shows a flange connection 1 coupling a housing of an engine 2 with a gear box 3 in an interlocking force transmitting form-fit. The flange connection 1 extends coaxially and concentric around a central engine axis A that is also the central axis of the gear box 3. The housing of the engine 2 comprises a flange ring 4A extending into a concentric centering ring 5. The gear box 3 comprises a flange ring 4B provided with a centering shoulder 6 for cooperation with the centering ring 5 of the engine 2. The centering ring 5 and shoulder 6 provide a radial centering between the engine 2 and gear box 3. The flange 4A is provided with a conical or slanted flange clamping surface 7A. The flange 4B is provided with a respective conical flange clamping surface 7B. The surfaces 7A and 7B face substantially axially except for a slanting angle $\alpha$ as shown in FIG. 4B for the clamping flange surfaces 7A and 7B. The slanting angle $\alpha$ is measured relative to the central axis A and is preferably about 70°, whereby the respective flange clamping surfaces 7A and 7B taper radially outwardly. Ideally, the central flange axis and the central power output axis of the engine 2 will coincide in the axis A.

Figure 2:
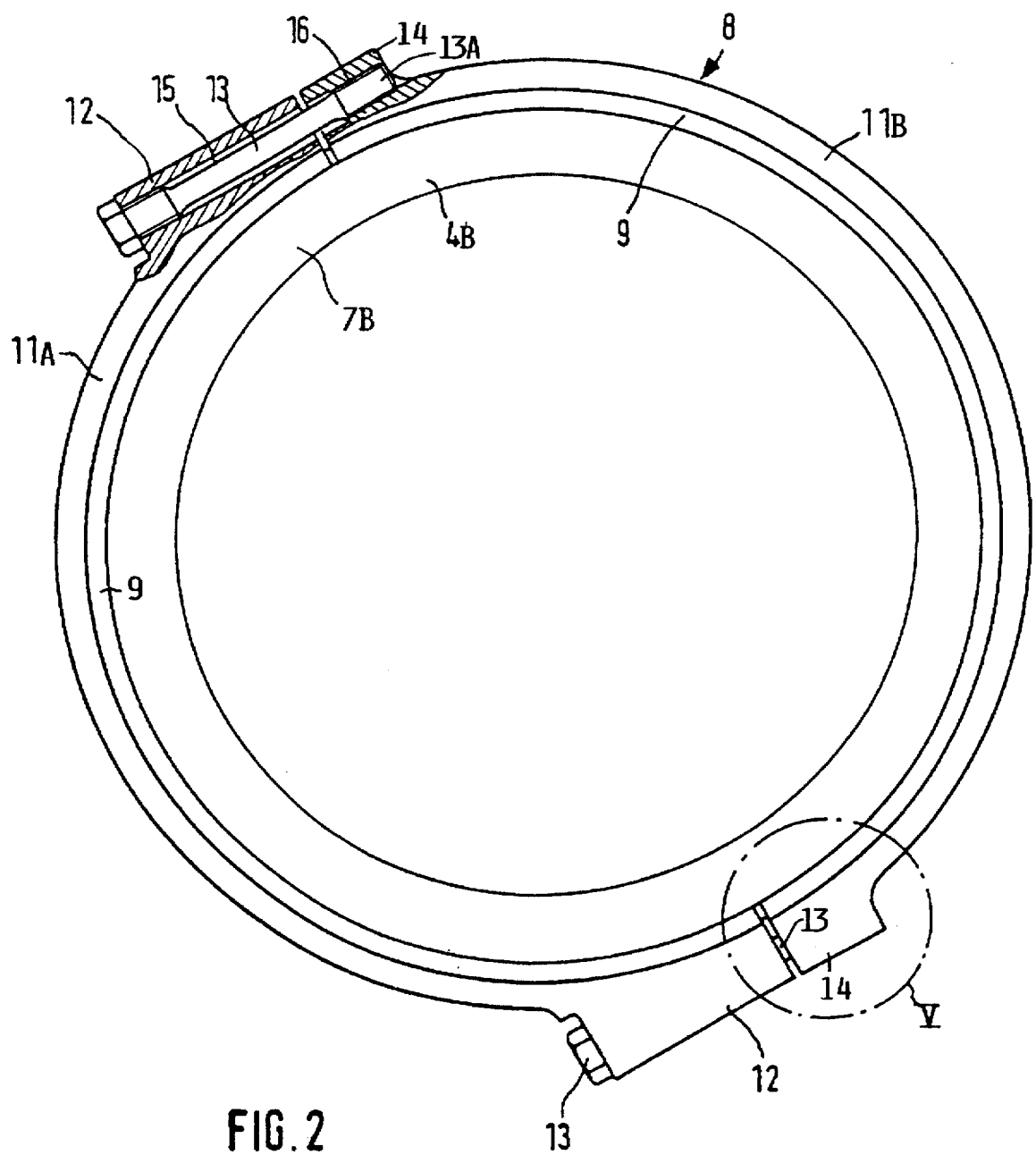
FIG. 2 is a view approximately in the direction of the arrows II—II in FIG. 1 and showing clamping ring section ends in a sectional view.

FIG. 1 shows the flange connection 1 in the mounted, clamped condition, wherein the flanges 4A and 4B are axially pressed together by axially effective clamping force components exerted by the present clamping ring 8 having a C-cross-sectional configuration. The clamping ring 8 preferably has two ring sections 11A and 11B as shown in FIG. 2 interconnected by connecting elements 13, such as threaded bolts, for clamping the two rings circumferentially together, to thereby exert the above mentioned circumferentially uniformly distributed axial clamping force on the flanges. For this purpose, each ring section 11A and 11B is equipped with radially inwardly reaching ring rims 9 provided with the conical ring clamping surfaces 10A and 10B best seen in FIG. 4A. These conical ring clamping surfaces 10A and 10B preferably have a conical slant corresponding to the slant $\alpha$ of about 70° of the flange clamping surfaces 4A and 4B. The ring clamping surfaces 10A and 10B encircle the flange clamping surfaces 4A and 4B, whereby the same slanting angle of about 70° facilitates the surface to surface ring-shaped area contact between the flange and ring clamping surfaces uniformly around the entire circumference of the flanges 4A and 4B as soon as the clamping ring 8 is tightened by the connector elements 13 applying a circumferential clamping force which drives the ring sections 11A and 11B radially inwardly, as will be described in more detail below. The ring sections are sufficiently elastic.

FIG. 2 shows how the ring 8 is divided into two ring sections 11A and 11B, each having the above mentioned ring rims 9. Further, the ring section 11A is provided with thickened section ends 12, while the ring section 11B is provided with thickened section ends 14. The section ends 12 are somewhat longer in the tangential direction and are provided with through-guide bores 15 for a connector element 13, such as a clamping bolt having a threaded end 13A engaging a female threading 16 inside the section ends 14. As shown, the ring section 11A has two section ends 12 with through-bores 15, while the ring section 11B has two section ends 14 with female threadings 16 at each ring section end. This arrangement has the advantage that the heads of the clamping bolts 13 are accessible from the same side. However, for certain applications it may desirable to provide each ring section with a section end having a through-bore and with a further section end having a threaded bore. In FIG. 2 the flange 4B with its flange clamping surface 7B is seen in the view direction II—II of FIG. 1.

Figure 3:
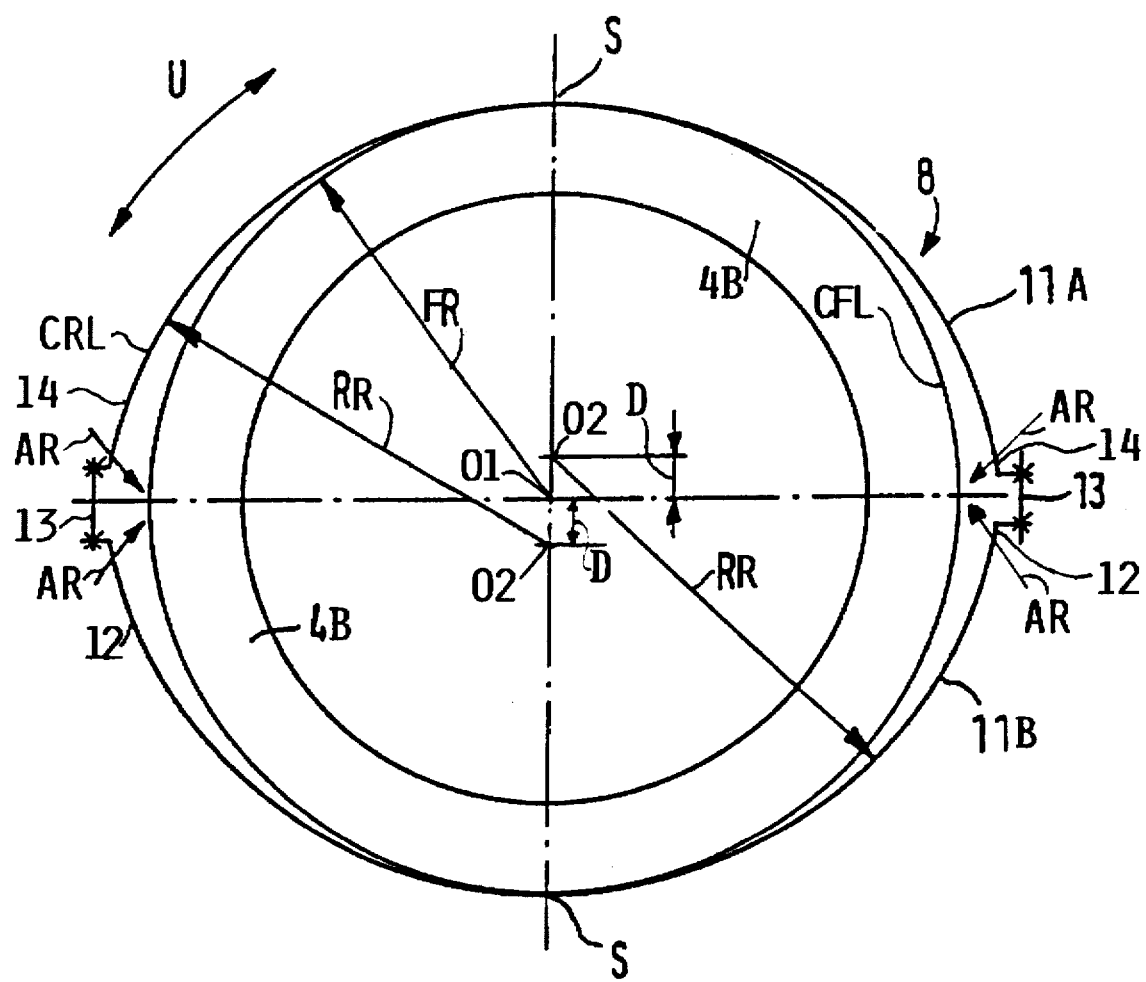
FIG. 3 is a schematic illustration of the relationship between the center ring radius RR and the center flange radius FR, whereby the respective arrows extend between a corresponding origin and a center-line through the respective ring clamping surfaces and flange clamping surfaces.

The schematic illustration of FIG. 3 shows the conical ring clamping surface of the clamping ring 8 only symbolically along its center ring line CRL. Similarly, the flange 4B and the flange 4A behind the flange 4B are only shown by their respective center flange line CFL. These center lines CRL and CFL are best understood by viewing FIG. 3 in conjunction with FIGS. 4A and 4B. The center ring line CRL passes centrally along the conical ring clamping surface 10A and 10B. The center flange line CFL passes centrally along the conical flange clamping surfaces 7A and 7B. According to the invention, the center ring line CRL has a radius RR which is slightly larger than the respective flange radius FR of the center flange line CFL. The flange radius FR has an origin O1 on the central axis A. The ring radius RR has an origin O2 spaced from the origin O1 by a spacing D. This spacing D or rather the slightly larger radius RR enables the present ring sections 11A and 11B to initially contact the flanges 4A and 4B at apex points S prior to any clamping action by the connector element 13. At this time, just prior to clamping, the ring sections ends 12 and 14 are spaced radially outwardly from the circumferentially radially outwardly facing surfaces of the flanges 4A, 4B. This radial outward spacing is achieved by the difference D in the length of the two radii RR and FR. As can be seen in FIGS. 4A and 4B the radii RR and FR are measured to the respective center line CRL and CFL. As soon as the clamping or connector elements, such as screws 13, are tightened, the ends 12 and 14 move along a composite path indicated by the arrows AR in FIG. 3. This composite path includes a radially inward component and a circumferential or tangential component, whereby it is assured that the surface area contact between the conical ring clamping surfaces 10A and 10B and the conical flange clamping surfaces 7A and 7B takes place gradually from the apex point S toward the connector element 13.

Prior to completing the clamping operation the ring sections 11A and 11B are easily rotated relative to the flanges in the circumferential direction U. This rotation is facilitated due to the point contact at the apex points S. The point contact at S is then converted into a surface area contact uniformly distributed around the flanges at substantially all along 360° when the screws 13 are tightened.

Figure 5:
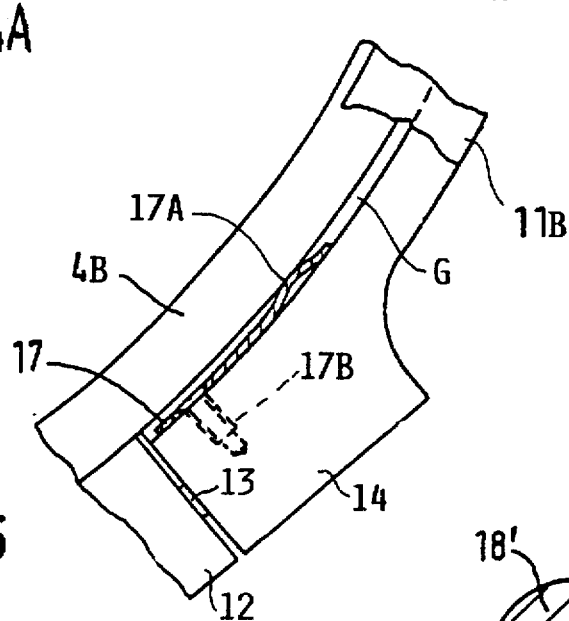
FIG. 5 shows, on an enlarged scale the detail V in FIG. 2 illustrating the position of a leaf spring in the circumferential gap between the flanges and the respective ring segments.

Referring to FIG. 5, the circumferential adjustment is facilitated by inserting a leaf spring 17 in a gap G between the flanges 4A, 4B and the respective ring section 11A, 11B. Because the leaf spring 17 guides the ring relative to the flanges and minimizes any surface area contact therebetween. For this purpose, the leaf spring 17 has a small bulge 17A which is so configured that the contact between the ring and the flange is optimally reduced while still assuring a proper guiding of the ring rotation around the flanges, even prior to any clamping operation. The leaf spring 17 is rigidly secured to the respective ring, for example by screws 17B. Preferably, two leaf springs 17 are provided for each ring section 11A, 11B. These leaf springs 17 are preferably positioned near the section ends 12 and 14.

As mentioned, the longer radius RR compared to the radius FR is critical because it is thereby assured that initial contact between the flanges and the ring sections is limited to the apex points S so that the ring section ends 12 and 14 are free for relative rotation prior to clamping. As a result, when the clamping begins, the ring sections approach the flanges starting from the apex points S and then surface area contact is gradually established toward the section ends 12,14 to thereby assure above mentioned uniform surface area contacts with a motion that is effective in both circumferential directions. Upon completion of the clamping the axially effective clamping force components are substantially uniformly distributed around the flange surface areas for 360°, thereby assuring a uniform sealing quality all around the clamping ring unhindered by any radially effective force components. In the ring according to the invention, any contact between radially outwardly facing circumferential surface areas of the flanges and radially inwardly facing surface areas of the clamping ring sections has been minimized or even completely avoided except where the leaf springs 17 are contacting the radially outer flange surfaces at 17A.

Figure 6:
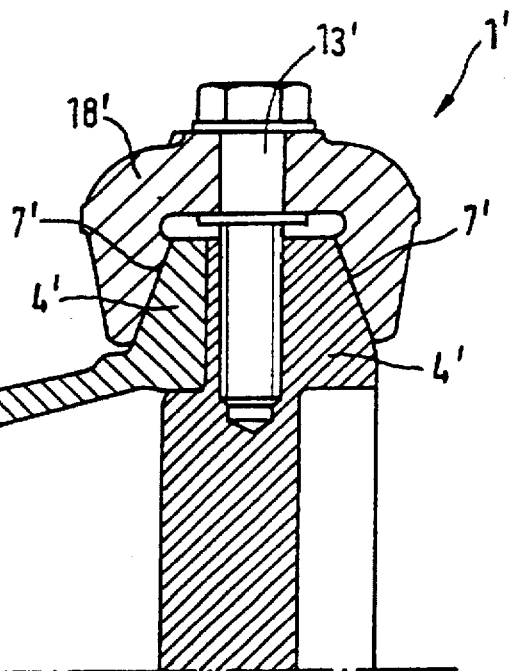
FIG. 6 is an axial sectional view through a conventional flange connection with individual C-clamps distributed circumferentially around the flanges.

FIG. 6 illustrates a conventional flange connection 1' in which clamps 18' having a C-cross-sectional configuration are cooperating with their conical ring clamping surfaces 7' with respective conical flange clamping surfaces of the flanges 4'. The C-clamps 18' are held in place by radially extending screws 13', which are not easily accessible all around in tight spaces. A gradual engagement between the just mentioned conical clamping surfaces all around the flanges is not possible in such structure.

Although the invention has been described with reference to specific example embodiments, it will be appreciated that it is intended to cover all modifications and equivalents within the scope of the appended claims.

What is claimed is:

1. A clamping ring for securing two flanged components to each other, each flanged component having a radial end flange (4A, 4B) with a substantially axially facing conical flange clamping surface (7A, 7B) so that two conical flange clamping surfaces (7A, 7B) are facing in opposite directions away from each other, said conical flange clamping surfaces having a center flange radius (FR), said clamping ring (8) comprising at least two ring sections (11A, 11B) and circumferentially effective connector elements (13) for interconnecting and tightening said at least two ring sections, each ring section (11A, 11B) comprising two axially spaced radially inwardly extending ring rims (9), each ring rim (9) having a substantially axially facing conical ring clamping surface (10A, 10B) so that two conical ring clamping surfaces (10A, 10B) face each other and said conical flange clamping surfaces (7A, 7B), said ring clamping surfaces having a center ring radius (RR) which is longer by a length (D) than said center flange radius (FR) to provide a gradual contact or engagement between said conical clamping surfaces when said ring sections (11A, 11B) are clamped together around said end flanges in response to tightening said connector elements (13), whereby said length (D) defines a distance between an origin (O1) of said center flange radius (FR) on a center axis (A) of said end flanges, and an origin (O2) of said center ring radius (RR) at the beginning of a clamping operation.

2. The clamping ring of claim 1, wherein said conical flange clamping surfaces (7A, 7B) and said conical ring clamping surfaces (10A, 10B) each has a slanting angle ($\alpha$) of about 70° relative to said central ring rotational axis (A).

3. The clamping ring of claim 1, wherein each of said ring sections (11A, 11B) has thickened ends (12, 14) for receiving said connector elements (13) for clamping said ring sections circumferentially together.

4. The clamping ring of claim 3, wherein said thickened ends (12, 14) have through bores and wherein said connector elements (13) comprise screws passing through said through bores and nuts cooperating with said screws.

5. The clamping ring of claim 3, wherein said thickened ends (12, 14) have through bores and threaded bores arranged in pairs, and wherein said connector elements (13) comprise threaded bolts passing through said through bores and engaging said threaded bores.

6. The clamping ring of claim 1, wherein each of said two ring sections has a length that covers approximately 180° of a circle having said center flange radius (FR).

7. The clamping ring of claim 1, wherein each of said ring sections (11A, 11B) comprises at least one leaf spring (17) secured to its ring section, said leaf spring (17) being positioned on a radially inwardly facing surface between said two ring rims (9) for providing substantially, prior to clamping, a point contact (17A) between said radially inwardly facing surface of said ring section and respectively radially outwardly facing surfaces of said end flanges (4A, 4B) to facilitate a relative rotation between said end flanges and said ring sections (11A, 11B) prior to clamping.

8. The clamping ring of claim 7, wherein each ring section has two ends and wherein said leaf spring (17) is positioned near at least one ring section end (12 or 14).

* * * * *